US008636256B2

United States Patent
Mosler et al.

(10) Patent No.: US 8,636,256 B2
(45) Date of Patent: Jan. 28, 2014

(54) CURTAIN SUPPORT ASSEMBLY, IN A FRAMEWORK DESIGN, IN A CABIN OF A VEHICLE

(75) Inventors: Michael Mosler, Hamburg (DE); Andreas Neumann, Wakendorf (DE)

(73) Assignee: Airbus Operations GmbH (DE)

(*) Notice: Subject to any disclaimer, the term of this patent is extended or adjusted under 35 U.S.C. 154(b) by 286 days.

(21) Appl. No.: 12/412,669

(22) Filed: Mar. 27, 2009

(65) Prior Publication Data
US 2009/0242150 A1 Oct. 1, 2009

Related U.S. Application Data

(60) Provisional application No. 61/072,459, filed on Mar. 31, 2008.

(30) Foreign Application Priority Data

Mar. 31, 2008 (DE) .......................... 10 2008 016 422

(51) Int. Cl.
*A47H 1/00* (2006.01)
*B64C 1/10* (2006.01)
*E04B 1/16* (2006.01)
*B61D 19/00* (2006.01)

(52) U.S. Cl.
USPC ................. 248/264; 244/121; 52/64; 16/87 R

(58) Field of Classification Search
USPC ................. 248/683, 689, 214, 230.7, 231.81, 248/316.7, 264; 40/603; 16/87 R
See application file for complete search history.

(56) References Cited

U.S. PATENT DOCUMENTS

| 1,749,450 | A | * | 3/1930 | Streich | 160/38 |
| 2,508,737 | A | * | 5/1950 | Zeto | 248/263 |
| 2,516,805 | A | * | 7/1950 | Roth et al. | 454/76 |
| 2,710,731 | A | * | 6/1955 | Bright et al. | 244/118.6 |
| 2,748,851 | A | * | 6/1956 | Bussard | 160/126 |
| 2,756,438 | A | * | 7/1956 | Soberman | 4/608 |

(Continued)

FOREIGN PATENT DOCUMENTS

| DE | 19526525 C1 | 2/1997 |
| DE | 202007013134 U1 | 12/2007 |
| WO | WO2009036738 A2 * | 3/2009 |

OTHER PUBLICATIONS

Gerold et al. WO2009036738 Machine Translation, Lightweight Construction Element.*

(Continued)

*Primary Examiner* — Jonathan Liu
*Assistant Examiner* — Chiedu Chibogu
(74) *Attorney, Agent, or Firm* — Lerner, David, Littenberg, Krumholz & Mentlik, LLP

(57) ABSTRACT

The invention relates to a curtain support assembly to receive a curtain rail for a curtain for separating at least two regions in a cabin of a vehicle, comprising one or several header components for covering a space formed between the curtain rail and a ceiling in the cabin. The assembly according to the invention comprises one or several load-bearing frame structures, each comprising at least one profile component, on which in each case on at least one side the header components are arranged. The frame structure may be made from standard components and may comprise header components that are hardly subjected to any mechanical loads and that are therefore less demanding to produce.

12 Claims, 5 Drawing Sheets

(56) References Cited

U.S. PATENT DOCUMENTS

| | | | | |
|---|---|---|---|---|
| 3,493,032 | A | * | 2/1970 | Ballard et al. ............... 160/201 |
| 4,121,790 | A | * | 10/1978 | Graham ..................... 244/118.5 |
| 4,222,427 | A | * | 9/1980 | Buchner ........................ 160/19 |
| D315,027 | S | * | 2/1991 | Abbestam et al. ........... D25/124 |
| 5,165,626 | A | * | 11/1992 | Ringger et al. ............ 244/118.5 |
| 5,189,758 | A | * | 3/1993 | Levy .......................... 16/87.4 R |
| 5,393,013 | A | * | 2/1995 | Schneider et al. ......... 244/118.5 |
| D366,322 | S | * | 1/1996 | Palermo ....................... D25/124 |
| 5,577,358 | A | * | 11/1996 | Franke ........................ 52/238.1 |
| 5,598,880 | A | * | 2/1997 | Cross ............................. 160/38 |
| 5,816,534 | A | * | 10/1998 | Schumacher ................. 244/119 |
| 6,389,773 | B1 | * | 5/2002 | Reuter et al. ................. 52/582.2 |
| 6,397,532 | B1 | * | 6/2002 | Shipman et al. ........... 52/220.7 |
| 6,523,779 | B1 | * | 2/2003 | Michel ....................... 244/118.5 |
| 2004/0237254 | A1 | * | 12/2004 | Lin ............................... 16/87 R |

OTHER PUBLICATIONS

Bosch Rexroth Corp, Joining Plates, Mar. 22, 2006, http://web.archive.org/web/20060322162621/http://www13.boschrexroth-us.com/Framing_Shop/pdf/102/p./0203-34.pdf.*

* cited by examiner

CURTAIN SUPPORT ASSEMBLY, IN A FRAMEWORK DESIGN, IN A CABIN OF A VEHICLE

CROSS-REFERENCE TO RELATED APPLICATIONS

This application claims the benefit of the filing date of U.S. Provisional Patent Application No. 61/072,459 filed Mar. 31, 2008, the disclosure of which is hereby incorporated herein by reference.

The invention relates to a curtain support assembly in an aircraft cabin.

BACKGROUND OF THE INVENTION

Such assemblies, which are also known as header panels or curtain headers, are used, for example in an aircraft cabin, to accommodate a curtain rail while at the same time creating a blocking-out and/or light-proof separation device between the upper edge of a separation curtain that is guided in the curtain rail and the cabin ceiling located above it. Furthermore, there is the option of integrating illuminated indicating signs in the component, for example exit signs or a lavatory occupied sign. As a rule, these arrangements are constructed in the so-called prepreg design, in which a resin-soaked woven fibre fabric is made to assume a desired shape before it is cured, wherein frequently a honeycomb structure is used as the core of this material. Such honeycomb sandwich panels have a relatively light specific weight while nonetheless providing good strength values. However, processing such panels is very expensive, so that the production costs are high. During production, for example, the basic shape of a component has to be milled from a honeycomb block that on its own, without any additional laminate, is however quite unstable. Individual honeycomb cells of the honeycomb structure are made from paper and are glued to form a block. After the basic shape of the component has been produced, it is necessary to place a laminate from the outside onto the basic shape in order to ensure dimensional stability. Subsequently, the component produced in this way may be primed and painted. If components of a constant thickness are to be produced, it is also possible to process prefabricated honeycomb sandwich panels. This type of panel may then assume a desired shape when the panels are heated and gradually pressed to shape. In the production of accommodation arrangements for a divider curtain it is, furthermore, expensive to produce holding devices for attachment to lateral or central hatracks or overhead stowage compartments (OHSCs) or for the cabin ceiling, or to integrate indicating signs.

SUMMARY OF THE INVENTION

The above-mentioned arrangements from prior art are thus associated with several disadvantages. In particular, apart from the high production costs resulting from the very considerable production effort, almost every one of the header panels is a one-off item, since due to the various cabin layouts of aircraft operators there is usually no modular solution available for integration in aircraft cabins. This results in greater costs for alterations if the design of an aircraft cabin, once planned, needs to be modified. Finally, material costs are high as a result of the honeycomb structure, the availability of which is at times limited.

It may thus be the object of the invention to propose a curtain support assembly in a cabin of a vehicle, which assembly is light in weight, makes it possible to achieve low production costs combined with little production effort, and furthermore makes possible a number of variations and modifications, with the use of a modular principle, without involving high costs of modification, and further makes possible economical changes at a later project phase.

The object is met by an arrangement according to claim 1. Advantageous improvements are disclosed in the subclaims. Furthermore, the object is met by the usage and by an aircraft with the arrangement according to the invention.

A design that is based on a profile framework construction forms the basis of the assembly according to the invention. Instead of producing the entire assembly from a panel material that comprises a honeycomb core and is expensive to produce, said assembly may be constructed by means of a combination of several standard profiles (for example produced as extruded profiles available in lengths), which standard profiles are used to take up the resulting loads, wherein the framework structure composed in this manner is supplemented by lateral covering parts. It is particularly advantageous if such a frame profile is used that comprises recesses or profiles on the side facing the cabin floor, which recesses or profiles make it possible to receive curtain gliders or rollers. In this way a particularly lightweight and stable frame may be constructed that at the same time serves as a curtain rail, and in which the additional lateral covering parts do not have to fully assume the actual function of attachment and absorption of the loads arising. Finally, the integration of indicating signs in the lateral covering parts is relatively simple because the mechanical requirements of the lateral covering parts are relatively modest, with said lateral covering parts being able to be made from textile fabric, wood, carbon fibre laminate, thermoplastics, plastics, thin sheet metal etc. Frequently, indicating signs (exit signs, lavatory occupied signs etc.) are used in the cabin region, but the integration of such components and their electrical cabling, in particular routing of the electrical cables, is also possible without any problems. Likewise, signage produced in a conventional manner with printed lettering, fluorescent stickers or other signs may be applied without any problems.

BRIEF DESCRIPTION OF THE DRAWINGS

The invention is described in more detail with reference to the figures. In this arrangement the same reference characters designate identical items. The following are shown.

DETAILED DESCRIPTION

Figure 1:
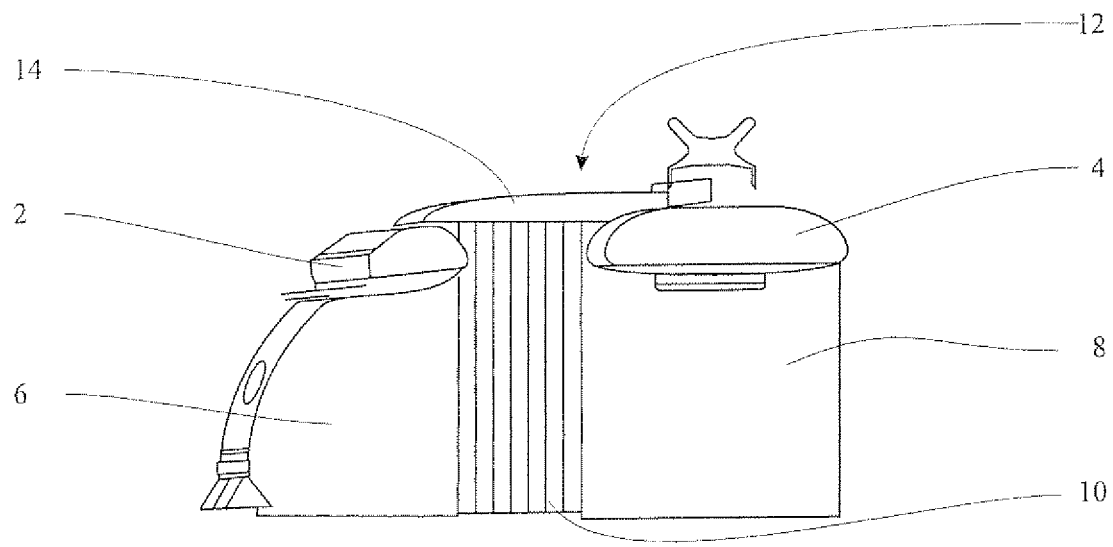
FIG. 1: a cabin section with the installed position of the assembly according to the invention.

The assembly for holding and providing a header for a curtain in an aircraft cabin is usually designed as shown in FIG. 1. On overhead stowage compartments, so-called hatracks 2 and 4, which are located laterally and in the centre of the cabin, partitions 6 and 8 are arranged, which extend to the floor of the cabin. Between the two partitions 6 and 8 a curtain 10 extends, which is guided on a curtain rail 12. This curtain rail 12 is covered by lateral covering parts 14 that extend upwards right to the cabin ceiling. In this way a separation device between different cabin regions, which comprise for example different classes, is provided.

Figure 2:
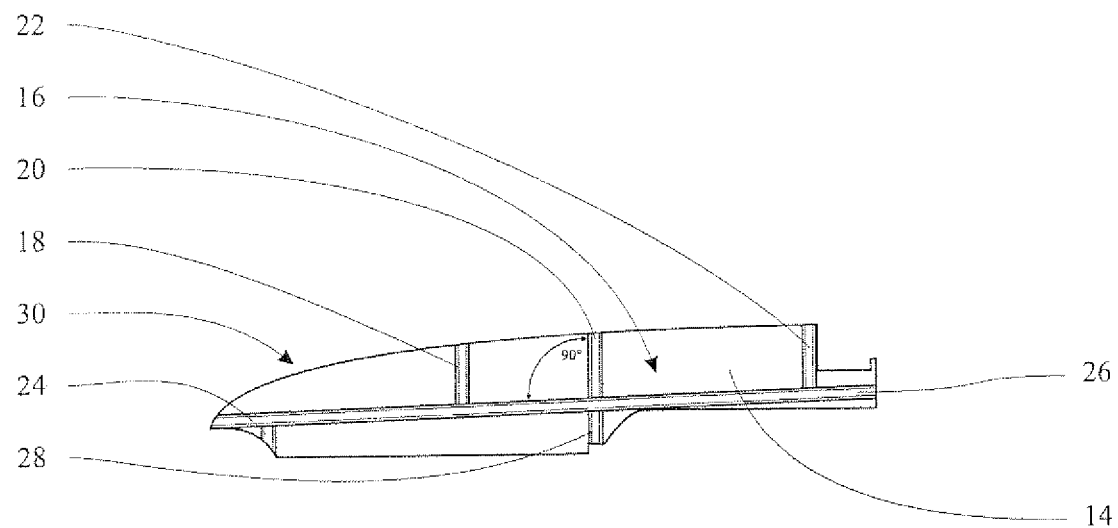
FIG. 2: a cross section of the assembly according to the invention.

FIG. 2 shows a first exemplary embodiment of the assembly according to the invention, in which embodiment a load bearing frame structure 16 comprising several profile parts 18 to 28 is designed. In this arrangement an elongated profile component 26 extends essentially along the entire length of the assembly and is supplemented at a particular spacing by means of profile components 18, 20, 22, 24 and 28, arranged perpendicularly to the above and to the load-bearing frame structure 16. For light-proof and vision-blocking paneling, lateral covering parts 14 are arranged on the load bearing frame structure 16 so that an element arises that overall is panel-shaped. It should be noted that the top 30 of a respective lateral covering part 14 preferably assumes the contour of the cabin ceiling so that as a result of the lateral covering part 14 conforming to the cabin ceiling a complete separation of two cabin regions between the cabin ceiling and the lower edge of the curtain may be provided.

Figure 3:
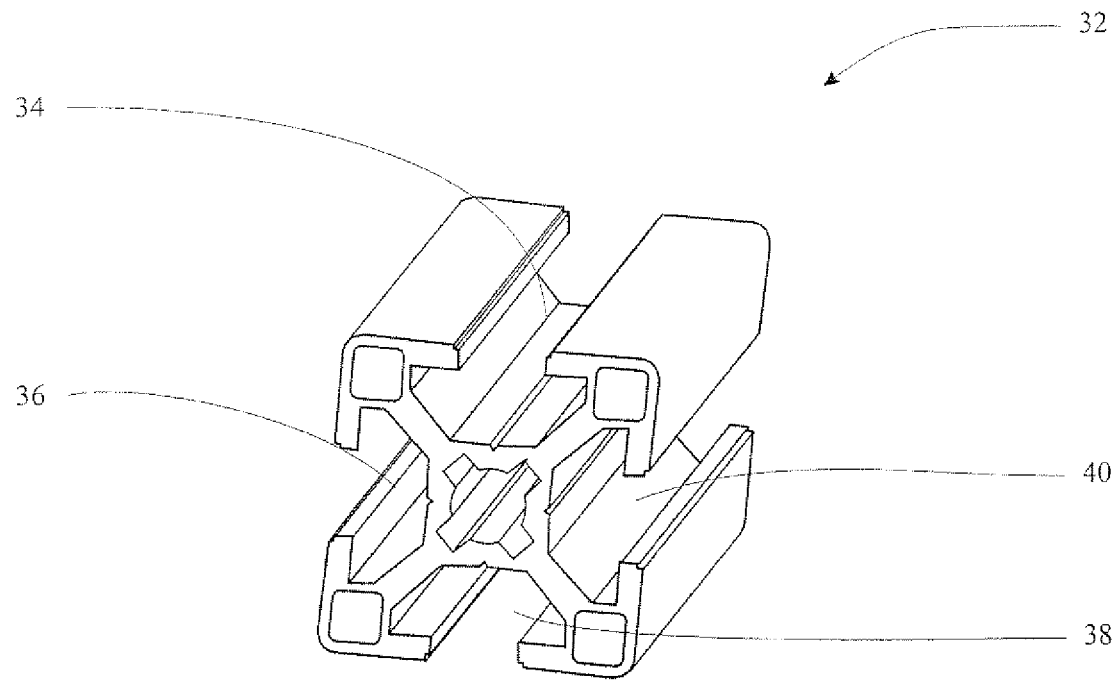
FIG. 3: a diagrammatic view of a load bearing frame structure profile.

The profile components 18 to 28 that preferably are to be used comprise a profile as shown in an exemplary manner in FIG. 3. Overall, the profile 32 has a square cross section that towards all four sides comprises undercut recesses 34-40. Sliding bodies or clamping bodies may be inserted into these recesses 34, which sliding bodies or clamping bodies, as a result of the undercut, cannot fall out or become detached on their own. For example, if the profile component 26 from FIG. 2 is implemented with the use of a profile 32 from FIG. 3, then curtain gliders could be inserted in the lower recess 38, by means of which curtain gliders the curtain could be pulled open or closed. Thus, profile 32 serves as the curtain rail 12. In an exemplary embodiment, one or more of profile components 18 to 28 may be made from extruded aluminum alloys, steel alloys or other alloys. In another exemplary embodiment, one or more profile components 18 to 28 may be made from a fibre-reinforced plastic.

Figure 4:
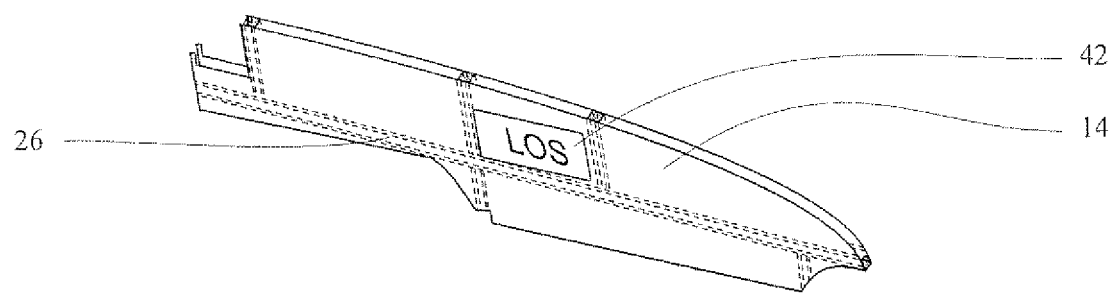
FIG. 4: an overall view of the arrangement according to the invention.

FIG. 4 shows a composed panel-shaped component that illustrates the assembly according to the invention. The profile parts 18 to 28 are shown dotted behind the lateral covering parts 14, wherein the profile part 26 takes up practically the entire length of the panel-shaped component. The lateral covering parts 14 may be made with the use of any desired materials that should comprise the lightest possible specific weight, and that hardly need to withstand any mechanical loads. Indicating signs 42 may be affixed relatively easily to the lateral covering parts 14. Integration of the illuminated indicating signs in the component may be carried out very easily. In contrast to arrangements from the state of the art, which arrangements require extensive milling work in the prepreg structure, in this case it is only necessary to cut openings in the lateral covering parts 14. Nor is it necessary to provide cable ducts, because the clad interior of the panel is hollow and thus provides sufficient space for the electric lines of the illuminated indicating signs.

Figure 5A:
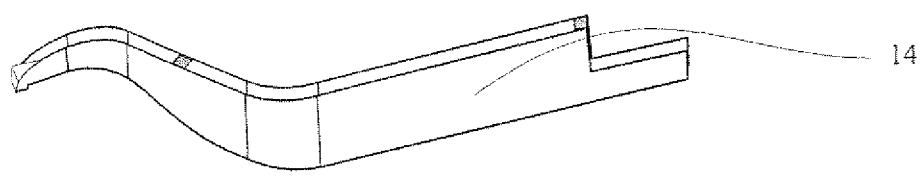
FIGS. 5a) and 5b): examples of possible contours of the assembly according to the invention.
Figure 5B:
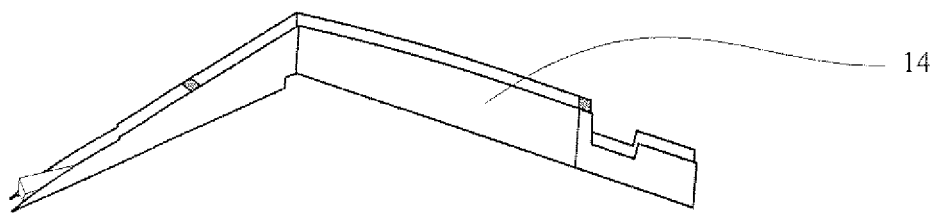

It is not necessary for the assembly according to the invention to have a completely flat shape, but instead, as shown in FIGS. 5a and 5b, it may also comprise contours that are curved as desired. For example, FIG. 5a shows a curved progression; 5b an angular contour progression that may conform to the individual design requirements in the cabin. This requires suitably formed frame components, which may, however comprise standard components with standard curvatures.

As a result of the arrangement according to the invention, a lower component weight, a lower production effort, lower production costs as a result of the use of a modular principle, and good availability of the material are achieved.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

List of Reference Characters

2 Overhead stowage compartment (hatrack)
4 Overhead stowage compartment (hatrack)
6 Partition
8 Partition
10 Curtain
12 Curtain rail
14 Lateral covering part
16 Load bearing frame structure
18-28 Profile component
30 Top of lateral covering part
32 Profile
34-40 Recesses in the profile
42 Indicating sign

The invention claimed is:

1. A curtain support assembly to receive a curtain for separating at least two regions in a cabin of an aircraft, comprising:
   a pair of lateral covering parts for covering a space between the curtain and a ceiling in the cabin and
   at least one load-bearing frame structure for carrying the curtain, the at least one load-bearing frame structure comprising an elongate profile component and a plurality of profile components extending from the elongate profile component at a predetermined spacing from one another, the elongate profile component comprising a first side and a second side opposite the first side, the second side facing the curtain, some of the plurality of profile components extending from the first side of the elongate profile component, the remainder of the plurality of profile components extending from the second side of the elongate profile component,
   wherein at least one of the profile components extending from the first side of the elongate profile component extends upwardly and away from the elongate profile component; wherein at least one of the plurality of profile components extending from the second side of the elongate profile component extends downwardly and away from the elongate profile component; wherein the elongate profile component and the plurality of profile components each compromise an identical profile; wherein the elongate profile component and the plurality of profile components each compromise a square cross section comprising an undercut recess along each of the four sides of the cross section
   wherein the elongate profile component is configured as a curtain rail for receiving the curtain, and
   wherein the pair of lateral covering parts are arranged on the at least one load-bearing frame structure on opposed sides of the at least one load-bearing frame structure.

2. The assembly of claim 1,
   wherein the at least one load-bearing frame structure is adapted for bearing the curtain load completely.

3. The assembly of claim 1,
   wherein the profile components are made from an extruded aluminium alloy, or a steel alloy.

4. The assembly of claim 1,
wherein the profile components are made from a fibre-reinforced plastic.

5. An aircraft comprising a cabin and at least one assembly to receive a curtain for separating at least two regions in the cabin of the aircraft, wherein the at least one assembly comprises:
a pair of lateral covering parts for covering a space between the curtain and a ceiling in the cabin; and
at least one load-bearing frame structure comprising an elongate profile component and a plurality of profile components extending from the elongate profile component at a predetermined spacing from one another, the elongate profile component comprising a first side and a second side opposite the first side, the second side is proximal to the curtain, some of the plurality of profile components extending from the first side of the elongate profile component, the remainder of the plurality of profile components extending from the second side of the elongate profile component the plurality of profile components,
wherein at least one of the profile components extending from the first side of the elongate profile component extends upwardly and away from the elongate profile component; wherein at least one of the plurality of profile components extending from the second side of the elongate profile component extends downwardly and away from the elongate profile component; wherein the elongate profile component and the plurality of profile components each comprise an identical profile; wherein the elongate profile component and the plurality of profile components each comprise a square cross section comprising an undercut recess along each of the four sides of the cross section wherein the elongate profile component is configured as a curtain rail for mounting the curtain; and
wherein the pair of lateral covering parts are arranged on the at least one load-bearing frame structure on opposed sides of the at least one load-bearing frame structure.

6. The assembly of claim 1,
wherein the at least one upwardly extending profile component extends toward the ceiling when the assembly is mounted.

7. The assembly of claim 1, further comprising, among the plurality of profile components, a second profile component having a longitudinal axis;
wherein said second profile component extends along said longitudinal axis away from the elongate profile component.

8. The assembly of claim 1, wherein the lateral covering parts extend upwardly from the at least one load-bearing frame structure towards the ceiling, when the curtain support assembly is mounted in the cabin.

9. The assembly of claim 8, wherein the pair of lateral covering parts each has an arcuate edge to conform with the ceiling when the assembly is mounted in the cabin.

10. The assembly of claim 8,
wherein the at least one upwardly extending profile components extends toward the ceiling when the assembly is mounted in the cabin.

11. The assembly of claim 5, wherein the pair of the lateral covering parts extend upwardly from the at least one load-bearing frame structure towards the ceiling, when the curtain support assembly is mounted in the cabin.

12. The assembly of claim 11, wherein the
at least one lateral covering part has an arcuate edge to conform with the cabin when the assembly is mounted in the cabin.

* * * * *